March 13, 1928.

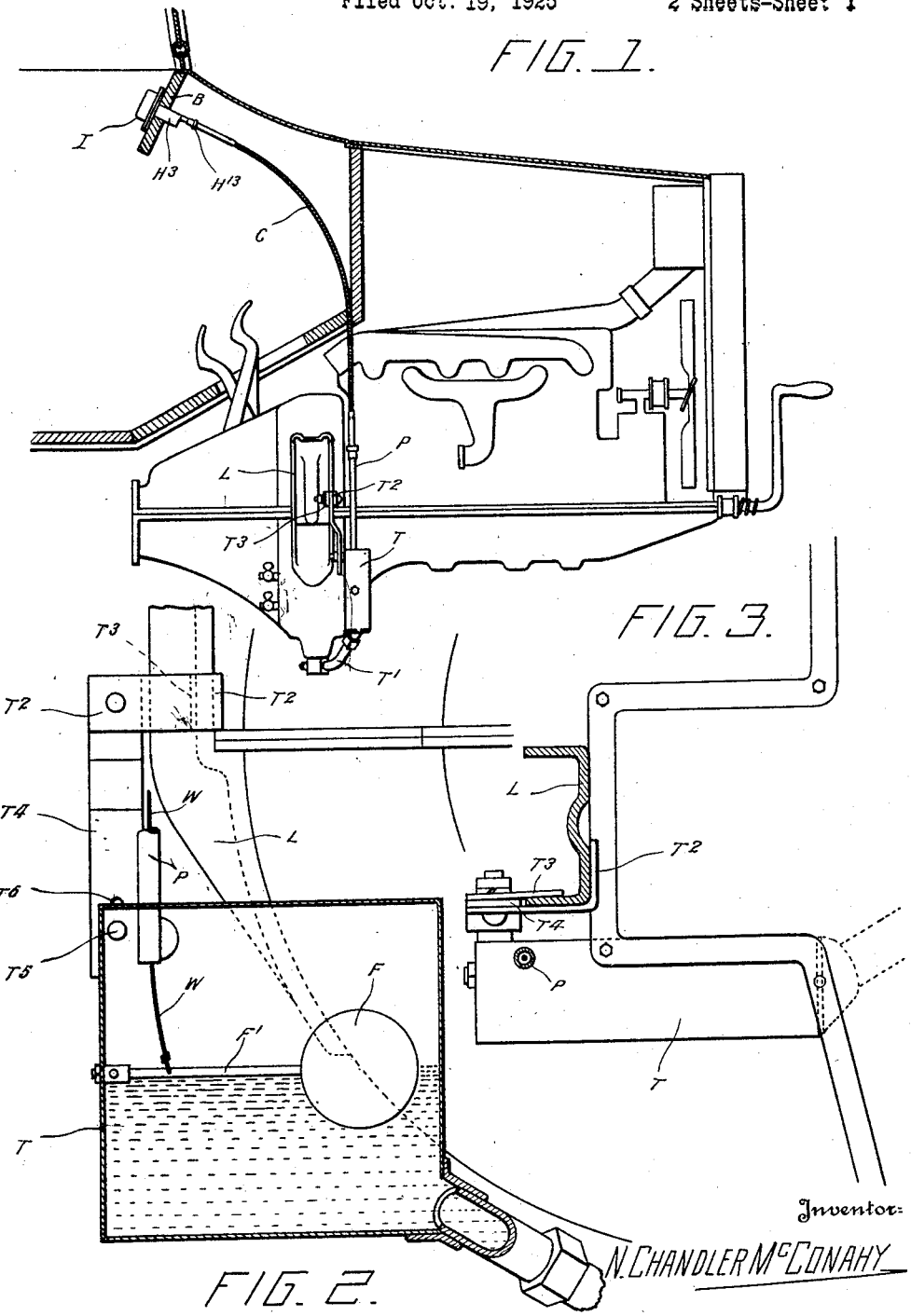

N. C. McCONAHY

INDICATOR

Filed Oct. 19, 1925

Inventor:
N. Chandler McConahy
By Ogle R. Singleton
Attorney

Patented Mar. 13, 1928.

1,662,463

UNITED STATES PATENT OFFICE.

NEWELL CHANDLER McCONAHY, OF TYRONE, PENNSYLVANIA.

INDICATOR.

Application filed October 19, 1925. Serial No. 63,453.

My invention consists in a new and useful improvement in indicators, and is designed more particularly for use in connection with that class of liquid level indicators generally used on automobiles to indicate the level of oil in the crank case of the engine.

The particularly valuable feature of my invention is the co-operation between the operative parts actuated by the variation of the liquid level and the operative parts designed to indicate the liquid level. I have provided an actuating rod which impinges upon a wire which operates the pointer of the indicator. Thus I have obviated any mechanical connection between the parts actuated by the liquid level and the parts operating the pointer. This feature is of great utility in connection with the installation of my device, since it is possible by the use of my construction to properly proportion the operative parts and accurately adjust them at the factory, thus obviating any adjustment at the time of installation. The device consists of a float tank, with an operating rod, which is applied to the crank case and a housing for the indicator mechanism which is applied to the instrument board. Both of these parts after being adjusted at the factory are sealed, and it is only necessary to insert the end of the operating rod into its socket in the housing to install the device.

Another valuable feature of my device is its ability to indicate a superfluous supply as well as an inadequate supply of oil in the crank case.

Another important feature is the fact that my device is operated by the buoyant effect of the oil to indicate an increasing supply and by spring action to indicate a decreasing supply, thus avoiding any dependence upon the gravital action of the float for actuation.

Another important feature of my device is the means which I provide for adjustably attaching the float tank to the crank case. This means permits both vertical and longitudinal adjustment of the tank, and may be attached to the crank case without the necessity of loosening any of the parts of the machine.

My invention is fully disclosed in the details of construction illustrated in the drawings and hereinafter fully described, but it is to be understood that I indicate herein only one specific embodiment of my invention and refer for its scope to the claim appended hereto.

In the drawings:

Fig. 1 is a side elevation partly in section of a portion of an automobile showing my improved indicator installed.

Fig. 2 is a vertical section of the float tank.

Fig. 3 is a top plan view showing the installation of the float tank.

Figure 6:
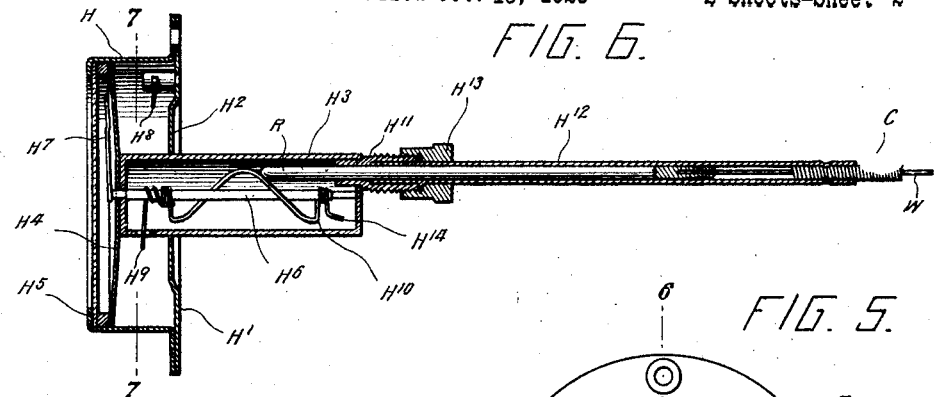
Fig. 6 is a vertical section on the line 6—6 of Fig. 5.
Figure 5:
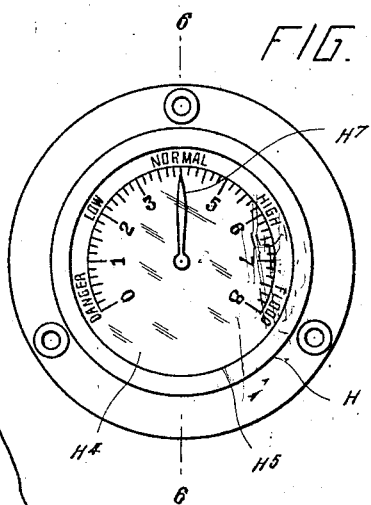
Fig. 5 is a front elevation of the indicator.
Figure 4:
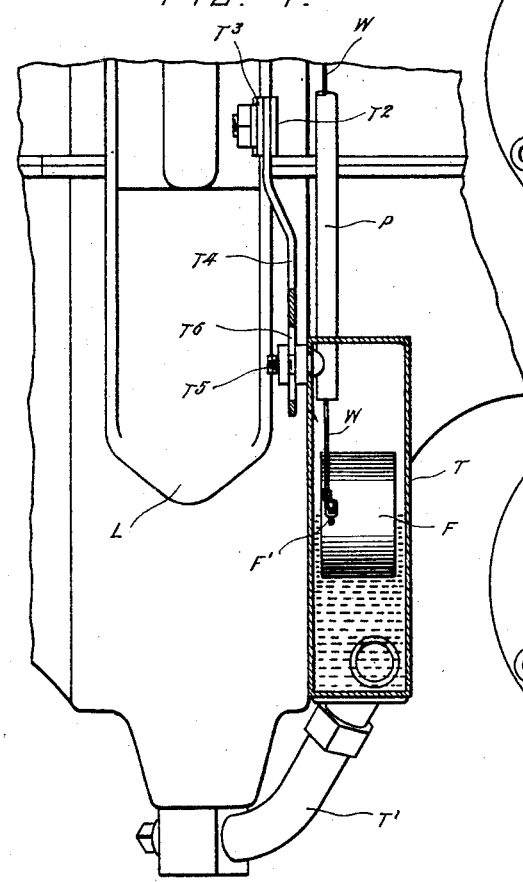
Fig. 4 is a side elevation enlarged of a portion of the engine crank case and a transverse section of the tank.
Figure 7:
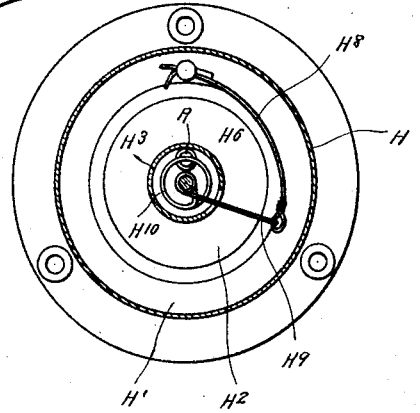
Fig. 7 is a vertical section on the line 7—7 of Fig. 6.

The device illustrated in the drawings comprises the float tank T, the indicator I and a flexible cable C connecting the float tank and the indicator. The tank T is connected to the drain cock of the crank case by a suitable pipe $T^1$ and is suspended from one of the motor legs L by the angle plate $T^2$ and plate $T^3$ bolted to the hanger $T^4$ which is adjustable on the tank T by the bolt $T^5$ through the slot $T^6$ in the hanger $T^4$. Within the tank T, the float F on the lever arm $F^1$ is pivoted to one end of the tank T at a point midway between the top and bottom of the tank T. A flexible non-ductile wire W is fastened to the arm $F^1$ and passes out of the tank T through the pipe P attached to the top of the tank T, and through the hollow flexible cable C extending upwardly to the instrument board B of the automobile.

The indicator mechanism is enclosed in a housing H having a back plate $H^1$ with a dished portion $H^2$. Extending rearwardly through this portion $H^2$ is a tubular casing $H^3$ on the front end of which is mounted a dial $H^4$ which, being slightly dished and flexible is adapted to hold the front glass $H^5$ snugly in place in the front of the housing H. Rotatably mounted longitudinally of the tubular casing $H^3$ is the shaft $H^6$ extending through the dial $H^4$ and having on its front end the indicator needle $H^7$. Suitably mounted in the housing H is the spring $H^8$ to which is attached the cord $H^9$ wrapped about the shaft $H^6$. Mounted upon the shaft $H^6$ and surrounding it is the spiral wire $H^{10}$. At its rear end the tubular casing $H^3$ is provided with a tube $H^{11}$ adapted to receive therein a second tube $H^{12}$ attached to the upper end of the flexible cable C, the tubes $H^{11}$ and $H^{12}$ being removably connected by the screw collar $H^{13}$. Attached to the upper end of the wire W in the tube $H^{12}$ is the operating rod R which, when the parts are assembled, extends through tubes $H^{11}$ and $H^{12}$ into the casing $H^3$, lying parallel with the shaft $H^6$ and in the plane of the spiral wire $H^{10}$. The shaft $H^6$ is also provided with a stop pin $H^{14}$ which contacts with the inner end of the tube $H^{11}$ to hold the shaft $H^6$ against the action of the spring $H^8$ so that when the parts are in normal position the needle $H^7$ will register zero on the dial $H^4$.

From the foregoing description of the parts of my device, its operation will be obvious. When the device is installed, the level of oil in the tank T will coincide with the oil level in the crank case. The buoyancy of the float F will cause it to respond to the oil pressure and through the arm $F^1$ will move the wire W. The reciprocation of the wire W will oscillate the rod R which impinging against the wire $H^{10}$ will cause it to rotate and thereby rotate the shaft $H^6$ and cause the needle $H^7$ to travel over the dial $H^4$.

Having described my invention, what I claim is:

In an indicator, the combination of a housing provided with a circular opening on one side and a wall on its opposite side; a glass face covering said opening; a tubular casing mounted in said wall of said housing; and a flexible dial mounted on said casing and adapted to clamp said glass face in position in the housing.

In testimony whereof I affix my signature.

NEWELL CHANDLER McCONAHY.

CERTIFICATE OF CORRECTION.

Patent No. 1,662,463.  Granted March 13, 1928, to

NEWELL CHANDLER McCONAHY.

It is hereby certified that error appears in the printed specification of the above numbered patent requiring correction as follows: Page 2, strike out lines 35 to 42, comprising the present claim and insert the following claim:

"In an indicator, the combination of a housing; a tubular casing protruding from said housing; a rotatable shaft mounted in said casing; a pointer mounted on said shaft and movable in said housing; a spiral wire mounted on said shaft; a pipe extending from said casing; a second pipe removably connected with said first pipe; and a rod slidably mounted in said pipes, extending into said casing and so positioned as to impinge against said wire when reciprocated.";

and that the said Letters Patent should be read with this correction therein that the same may conform to the record of the case in the Patent Office.

Signed and sealed this 24th day of April, A. D. 1928.

(Seal)

M. J. Moore,
Acting Commissioner of Patents.